United States Patent

[11] 3,622,766

| [72] | Inventor | Robert David<br>Paris, France |
|---|---|---|
| [21] | Appl. No. | 793,710 |
| [22] | Filed | Jan. 24, 1969 |
| [45] | Patented | Nov. 23, 1971 |
| [73] | Assignee | Societe Anonyme Societe Alsacienne De Constructions Atomiques De Telecommunications Et D'Electronique Alcatel, Paris, France |
| [32] | Priority | Jan. 25, 1968 |
| [33] | | France |
| [31] | | 137686 |

[54] DEVICE FOR ACCURATE POSITIONING OF MOVABLE MEMBERS ON A MACHINE TOOL
8 Claims, 6 Drawing Figs.

[52] U.S. Cl. .................................................. 235/151.11,
318/569, 318/604, 307/235, 235/197
[51] Int. Cl. ............................................................. G05b 19/38
[50] Field of Search............................................318/20.420,
20.430, 20.435, 20.426, 20.427, 20.425, 20.400,
20.110; 235/151.11, 197; 328/137, 154; 307/235

[56] References Cited
UNITED STATES PATENTS

| 2,766,412 | 10/1956 | Stephenson .................. | 318/28 |
| 3,136,933 | 6/1964 | Whitemore et al. .......... | 235/151.11 X |
| 3,206,663 | 9/1965 | Neal et al...................... | 318/18 K |
| 3,303,332 | 2/1967 | Gotz.............................. | 235/151.11 |

Primary Examiner—Eugene G. Botz
Attorney—Littlepage and Quaintance

ABSTRACT: The invention relates to a device for accurate positioning of movable members. To that effect, the member is driven into a position with accurate coordinates, the path of the member, being compounded in several elements whereby the first of them can be run at a maximum speed and the following at lower and lower speeds, so that when the displacement stops, the member occupies the accurate coordinates, and the quick and accurate positioning of the member is actuated according to a predetermined program.

PATENTED NOV 23 1971 3,622,766
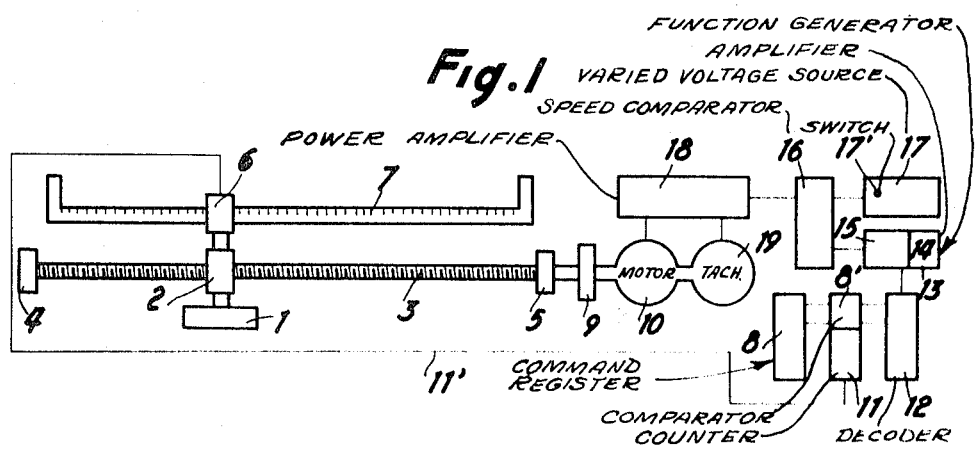
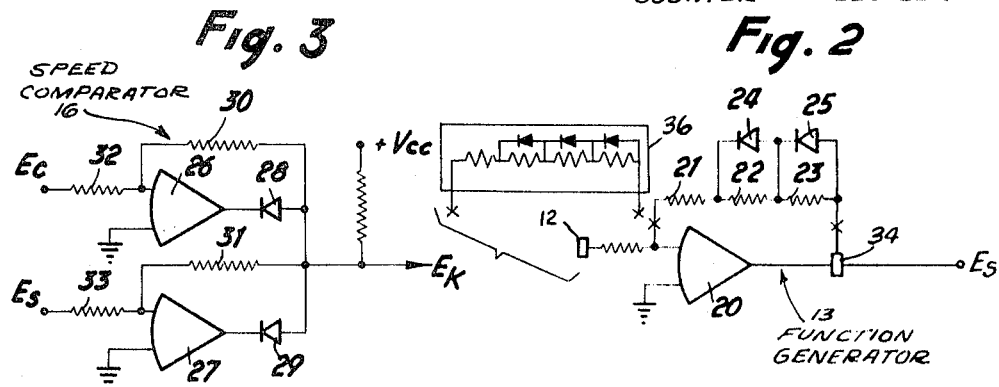
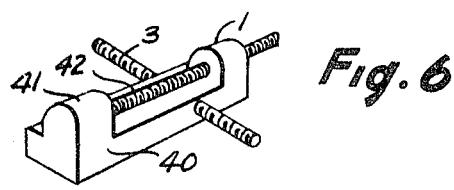
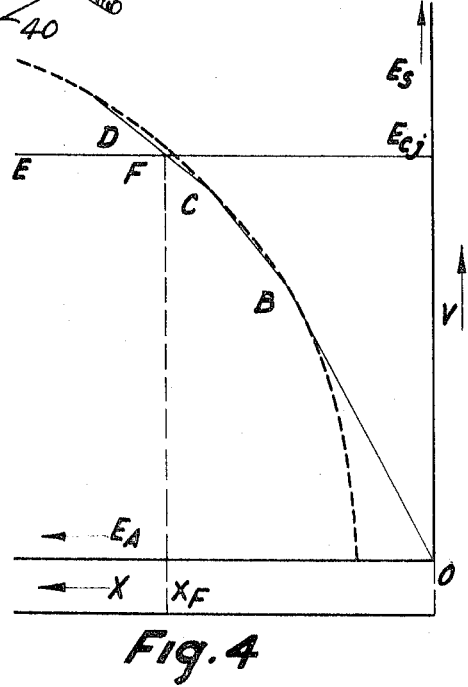
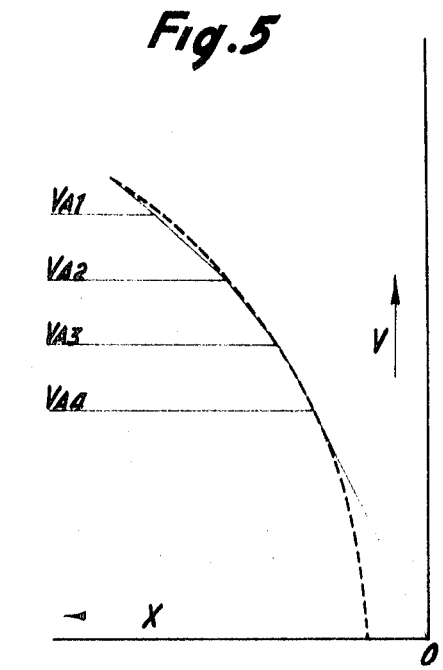
Robert David
Littlepage & Quaintance
Attys

DEVICE FOR ACCURATE POSITIONING OF MOVABLE MEMBERS ON A MACHINE TOOL

The present invention relates to a device for accurate positioning of movable members on a machine tool. The invention relates also to machine tools equipped with such a device. One already knows machine tools operated according to a program in order to drive the tool into the required position for a phase of the program in relation with the part to be machined.

Two types of positioning systems frequently used by the manufacturers are thus known. The first of them features a slave positioning, which is one of the best solutions of the problem but which is however very costly, slave positioning requires on the one hand the use of a low inertia and high overload ability motor, in conjunction with a kinematic backlashless chain involving the necessary use of ball screws, and on the other hand the detection of errors with their respective sign of which appear in relation with the aimed position.

Moreover, the said solution precludes the possibility of using a single motor in order to successively control several axis of displacement in view of backlashes due to the presence of the clutches and gearing.

The setting into the machining position of the movable member can also be carried out by using a device of step-deceleration. The final speed is then sufficiently low so that the member can be stopped on the accurate required position without overrunning this position. However, this solution leads to abnormally high positioning times when the distance to be run becomes of the same order as the dimensions corresponding to the points where the speed is modified.

The different above-mentioned drawbacks of the known devices are particularly appreciable in precision machining.

In order to eliminate the said drawbacks, the applicant had the idea of driving the tool into a position with accurately defined coordinates, the movement of the tool towards this position being at different speeds. The first speed is at a maximum compatible with requirements of the machine or at a speed convenient for the required machining, and the following other elements are run at lower and lower speeds in such a manner that when the displacement stops, the tool is accurately positioned at the desired coordinates. Thus, the quick and accurate positioning of the tool and the optimal operation of the automatic precision machining according to a predetermined program results. Now, it will be noted that, according to the invention, the machining tool can be moved as well as the part to be machined in mutual relation between each other. In that case both the part to be machined and the tool can be moved simultaneously or alternately toward the desired position, which may be referred to as the intermediary position. Taking these different possibilities into account, the term member has hereunder been taken as designation of the element (tool or part) which moves according to the invention.

Under these conditions, the device for positioning a movable member of a machine tool, with or without machining, by adjustment from a maximum value of the speed of displacement of the tool towards the said position, consists primarily, for each axis of displacement, of a motor for putting the movable member in motion, means for representing under digital form the position which has to be given to the movable member, a device for numerical measurement of the displacements of the movable member and converting the measured value into a digital data, a reversible counter receiving the digital indications of position to be given and of measured distances, a comparator determining the corresponding deviation of position, a decoder converting this deviation into an analog voltage, a function generator receiving at its input the said analog voltage and consisting of an operational amplifier and means supplying the amplifier with a negative feedback which changes with the output voltage of the amplifier and which is proportional to the speed of displacement of the member, a two-input comparator receiving, by one of its inputs, the output voltage of the said function generator, a source of reference voltages with means such as a switch for selecting the voltages and connected with the second input of the said comparator means to produce at its output only the lowest of the two voltages, i.e., the output voltage of the function generator and the voltage selected into the source of reference voltages, a power amplifier with two inputs and one output, connected with the motor for driving the movable member, a tachometer generator fastened onto the shaft of the said motor, delivering a voltage proportional to the speed of rotation of the motor into one of the inputs of the power amplifier, the other input receiving the voltage supplied by the said comparator, and the power amplifier output supplying the motor with the difference between the voltages applied to the power amplifier, this differential voltage being proportional to the speed of rotation of the motor.

The device for the digital measurement of displacement can consist for example of a graduated rule parallel to the path of the movable member and an optical reader of a known type locked with the displacement of the movable member and converting according to the known method the value of the read distance into a digital data.

The means which supply the negative feedback voltage of the amplifier of the function generator are advantageously interchangeable. The negative feedback of the function generator is obtained by an operational amplifier. Its circuitry is preferably made of a number of resistors connected in series between two inputs connected to the amplifier and of a number of diodes individually connected in parallel with some of the resistors. Such a circuit can be realized under the form of a "card" the terminals of which form a plug or pin intended to be plugged into a corresponding plug or terminal of the amplifier. A number of cards are available, each one being used for obtaining a given sequence of tool speeds on the total length of its path, namely one maximum speed and at least a low speed, preferably at constant deceleration. These cards can be designated by the term of "speed card." The necessary changes can also be obtained by any other means for example by soldering together the different components corresponding to a required characteristic and previously grouped on a convenient support.

According another feature of the invention, a second device similar to the preceding one can be fitted, which actuates by means of a second screw perpendicular to the first one the displacements of the member which are required for giving it the second coordinate accurately defining the required position, together with the one supplied by the first device.

According to one preferred embodiment of the invention, two such devices are employed simultaneously for a single movable member, so that the member may be moved simultaneously in two rectangular or polar coordinates. In one embodiment of the invention, one position screw moves a member in one direction and another screw, which slides along the first screw, moves the member in another direction.

It can be seen that the device according to the invention can be organized in such a manner that there is an automatic changing from the maximum speed displacement of the member to the reduced speed displacements. As it can be seen later on, this automatic changing takes place when the comparator detects the state where the voltage delivered by the function generator becomes lower than the voltage delivered by the source of reference voltage.

Hereunder an example for realization of a positioning device according to one of the selected coordinates is described.

IN THE DRAWINGS

FIG. 1 is a schematic view of such a device actuating the accurate adjustment of the movable member, which is a tool, along one of the coordinates to the desired position.

FIG. 2 illustrates a diagram of a function generator used in the device.

FIG. 3 shows diagrammatically a speed comparator used in the device.

FIG. 4 shows the speed characteristic of a function generator.

FIG. 5 illustrates the manner in which the feed speeds are related to a speed characteristic.

FIG. 6 shows a two device, double screw arrangement for moving the member in two coordinates.

Referring to FIG. 1, tool 1 which has to be brought into the required position is driven by a nut 2 fitted to be driven by the worm 3 fastened at its both ends into the bearings 4 and 5. An optical reader 6 of any known type, locked with the nut 2, moves before a graduated rule 7 parallel to the screw 3 and indicates the distances run or having still to be run by the movable member 1. The reader 6 is, for example, a pulse linear measurement system, such as the one of Dr. Johannes Heidenhain, preferably of the LIDA-55, 6-type. The reader 6 converts by any appropriate means the indications of distance to the desired position, read on the rule 7, into digital data. The machine keyboard features an introduction or command register 8 where the user introduces under numerical form the coordinate (s) defining the position the movable member has to reach.

The worm 3 is driven by the electric motor 10 through the speed reducer 9. The current-type reversible counter 11 is connected by the line 11' to the output of the optical reader 6. The control keyboard 8 is connected to a comparator 8', which is in its turn connected to the counter 11. The comparator produces and which set a digital data proportional to the difference between the digital data derived from the counter 11 and the digital data derived from the instruction-inserting register 8, and applies the digital data proportional to this difference to the input of the digital-analog decoder 12. This decoder converts the digital data received from the comparator 8' into analog voltages. The said analog voltages are applied to the input of a function generator 13, which consists of an amplifier 14 and an element 15 which produces a negative feedback and which shall be described later on in detail. At the output of the function generator 13 is thus available a voltage proportional to the speed to be given to the mobile tool. The output voltage of the function generator 13 is applied to one of the inputs of a comparator 16 (or speed comparator), the other input of which is connected to a source 17 of reference voltages which can be selected by the switch 17'. The source 17 supplies the different reference voltages which correspond to set speeds for tool feed, the maximum voltage corresponding to the quick speed of displacement. The construction of the comparator 16 is such as to supply at its output only the lowest of both voltages issued from respectively the function generator 13 and the source 17.

The power amplifier 18 receives, at one of its inputs the voltage delivered by the comparator 16, and at the other input the voltage delivered by the tachometer generator 19 fastened on the motor shaft 10, this voltage being thus proportional to the speed of rotation of the motor. The power amplifier 18 supplies at the output a voltage proportional to the difference between the voltages applied at its two inputs. The proportional output voltage is applied to motor 10.

The FIG. 2 illustrates schematically an embodiment of the function generator 13 with its negative feedback network. This generator consists of an operational amplifier 20, with three resistors 21, 22, 23 connected in series in its negative feedback circuit. A Zener diode 24 is connected across the resistor 22. A Zener diode 25, the Zener voltage of which is higher than the one of diode 24, is connected across resistor 23. Ordinary diodes connected in the forward direction can be used in place of the Zener diodes. On the other hand, it is possible, in order to increase the accuracy of the function realization, to increase as much as required the number of pairs of diode resistor 24, 22 25, 23, etc. Feedback card 36 containing a unique number of resistors and diodes may be plugged in to the amplifier 20 to change the function as desired.

As illustrated in the FIG. 3, the speed comparator 16 consists essentially of two operational amplifiers 26, 27, at the outputs of which have been connected diodes 28 and 29 in opposite direction of the amplified output current.

The negative feedback of both amplifiers 26 and 27 is obtained by resistors 30 and 31 having respectively the same value R. The input voltages $E_c$ and $E_s$ are applied to the negative input terminals of each of these amplifiers 26, 27 through resistors 32 and 33 respectively of the same value R.

The anodes of interconnected diodes 28, 29, are biased by a reference voltage $V_{cc}$. The output voltage $E_k$ is taken at the common point of the diodes.

If the voltages $E_c$ and $E_s$ (negative) are applied at the input of the comparator, 1. When $-E_c < -E_s$ then $E_k = -E_c$ with $E_k$ being the output voltage, the diode 28 is made conductive by the current from $V_{cc}$.

The amplifier 27 is saturated, and its output voltage is:
$E_{27} = +E_{sat}$, and s29 is cutoff. The diode 28 alone conducts.

2. When $-E_c > -E_s$ then also $E_k = -E_s$
3. When $-E_c = -E_s$ then $E_k = -E_c = -E_s$ In the function generator 13, with Z being the impedance of the negative feedback network, the negative feedback current is written $E_s/Z$ where $E_s$ is the output voltage measured at the point 35. This approximation is admissible and thus valid as long as the voltage at the input of the operational amplifier can be neglected towards $E_s$.

This case can be considered as normal as an operational amplifier works with a very high amplification factor.

Under these conditions, the amplification factor
$E_s/E_A = -Z/R$ and $E_s = -E_A Z/R$ If the output voltage $E_s$ is represented in terms of the input voltage, a straight line OB with a slope $-Z/R$ and passing through the origin (see FIG. 4) can be obtained from the former equation.

This relation between $E_A$ and $E_s$ remains valid for increasing values of the input voltage $E_A$ until the voltage drop in the resistor 22 becomes equal to the Zener voltage Vz of the Zener diode 24. The impedance Z undergoes then a sudden discontinuity, and the curve representing $E_s$ in terms of $E_A$ becomes a portion of straight line BC with a slope lower than OB and which passes no more through the origin. It can be easily seen that, for a second value $V_{z2}$ corresponding to the Zener diode 25, the representative straight line will undergo a variation of slope at the point C. The polygonal representative outline OBCD (FIG. 4) can be considered in a first approximation as consisting of a branch of parabola symmetrical beside the horizontal axis and not passing through the origin, prolongated at the point B by the tangent to this parabola from the point O. The input of the function generator 13 being connected to the output of the digital analog converter or decoder 12, the input voltage $E_A$ represents the distance x which the movable member has still to run. The output voltage $E_s$ is applied to the input of the speed comparator 16. If at the same moment the voltage $E_s$ is lower than a reference voltage defining the quick displacement speed of the movable tool, this voltage $E_s$ is applied to one of the inputs of the power amplifier 18 supplying the motor 10, the other input of this amplifier being connected to the tachometer generator 19 driven by the motor 10. The voltage $E_s$ then defines the displacement speed of the movable member. The above-mentioned curve can thus be considered as representative of the speed of displacement V of the movable member tool or in relation with the distance x which has still to be run. In case the figurative point is between D and B, the relation between x and V can be considered in a first approximation as a quadritic relation (arc of parabola) so that the movable tool moves then with a constant deceleration. The following relation is obtained:

$$V = \sqrt{2 \gamma x},$$

where $\gamma$ is a constant value of acceleration, usually gravitational acceleration.

on the portion DB of the representative curve.

When the distance which has still to be run becomes small, the gain of the operational amplifier becomes higher but does not reach the values susceptible of destabilizing the active loop. The voltage leaves curve of the constant deceleration displacement and follows the (straight) branch OB of the curve corresponding to a displacement speed, which varies in linear relation with the distance.

When the movable member or tool is far from the position to be reached, the displacement speed of the tool is given a predetermined set constant value to which corresponds a reference voltage $E_c$ supplied by the reference voltage source 17. This value $E_c$ selected by the switch 17' depends upon the nature of the movable member (tool or part holder carriage) and the type of displacement (displacement of the movable part or relative feed of the tool in respect of the part to be machined).

There is thus in every case a network of voltages $E_c$, $E_{c1}$, $E_{c2}$, .... $E_{cn}$ corresponding to different set speeds $V_{A1}$, $V_{A2}$, ..... $V_{An}$ (FIG. 4).

From all this, it results that for big distances to be run, the speed $V_A$ is lower than the speed defined by the relation:

$V = \sqrt{2\gamma x}$ where $\gamma$ is a constant value of acceleration.

On the representative curve of the FIG. 4, the figurative point traces the straight line parallel to the axis OX, the straight line EF with its ordinate equal to $E_{cj}$ intersecting the straight line DC at a point F.

From the corresponding distance $x_F$ on, the displacement speed of the movable member is no longer constant and equal to $V_j$, but follows a parabolic decreasing law with a constant deceleration, the speed comparator 16 switching the power amplifier 18 on the lowest speed (voltage).

FIG. 6 schematically represents a two-screw system for moving a member 1 in two coordinate directions—screw 3 is driven by a motor, and motion of member 1 along screw 3 is measured and controlled as shown in FIG. 1. At the same time, a second device 40, which moves along screw 3 with member 1, has a second motor 41 which turns second screw 42 to drive member 1 at an angle to screw 3. Motion of member 1 transverse to screw 3 is measured and controlled by a system which duplicates the system shown in FIG. 1.

According to the example just described, the measurement of the movement of the movable member ensured through a linear transducer which directly measures the translation. In said example, the information thus provided by the transducer was of the incremental type, i.e. the transducer delivered an electric signal each time the movable member was displaced for an elementary quantity (increment).

Another type of pickup has also been used; it was a rotating one, providing an indirect measurement of the displacement of the member, through a convenient kinematic system, such as screw-worm and/or gear-rack. In said case, the information was either incremental or coded, i.e. that for each position which the movable member was adapted to occupy corresponded only one combination of signals.

According to another embodiment there have been used transducer pickups associated with numeral-analog and/or analog-numeral systems of conversion, i.e. of the inductosyntype.

I claim:

1. A device for quick and accurate positioning of a movable member of a machine tool starting with a maximum value of displacement speed of the member toward a preselected position and ending with a minimum value of displacement speed comprising: a base, a motor connected to the base and connected to the movable member for actuating the displacement of the movable member, instructional means mounted on the base for receiving instructions and for representing instructions in digital form of a preselected position toward which the movable member is driven, measuring means connected to the base and to the movable member for measuring displacement of the member with respect to the base and for converting a value of measured distance into numerical data, a counter connected to the measuring means for receiving numerical data of measured distances therefrom, and a first comparator having a first input connected to the instructional means for receiving digital positional instructions therefrom and having a second input connected to the counter for receiving information therefrom and for determining corresponding positional deviation, a decoder having an input connected to the first comparator for receiving positional deviation and for converting the deviation into an analog voltage, a function generator connected to the decoder for receiving the analog voltage and comprising an operational amplifier and means for supplying the amplifier with a negative feedback changing with voltage from the amplifier, a source of selectable reference voltages mounted on the base, a second comparator receiving at one input output voltage from the function generator and receiving at a second input selected reference voltage from the reference voltage source, the second comparator comprising means for producing at its output only the lowest input voltage, a tachometer generator connected to the motor, a power amplifier having a first input connected to the second comparator and having a second input connected to the generator and having an output connected to the motor for supplying power to the motor at a voltage proportional to a difference between input voltages to the power amplifier.

2. A device according to claim 1, wherein the means for supplying the function generator with negative feedback comprises a number of series connected resistors in parallel with the operational amplifier and a number of diodes connected in parallel with some of the resistors.

3. A device according to claim 1 in which the function generator comprises a replacement card carrying element connected in a circuit, terminals of which are configured for connection to corresponding terminals connected to the operational amplifier of the function generator.

4. A device according to claim 1 in which the function generator comprises components which are grouped, selected and fitted on a convenient support and which are interconnected by solder.

5. A device according to claim 1 in which the second comparator comprises two operational amplifiers connected in parallel, each of the operational amplifiers having at its output a series connected diode connected in electrical direction opposite to a direction of amplified current.

6. A device according to claim 5 in which each of the operational amplifiers in the second comparator has a negative feedback circuit comprising a resistor mounted in parallel with the operational amplifier and a resistor connected in series with the operational amplifier on an input side thereof and further in which a biasing resistor is connected between a source of bias voltage and the diodes.

7. The device according to claim 1 further comprising a second device oriented at an angle with the first device to provide movement of the movable member with respect to the base in a second coordinate.

8. The device according to claim 7 in which each device has an elongated screw and in which the movable member is connected to the screws.

* * * * *